United States Patent [19]

Ogino et al.

[11] Patent Number: 5,023,524

[45] Date of Patent: Jun. 11, 1991

[54] GRID-DRIVE TYPE DISPLAY APPARATUS

[75] Inventors: Masanori Ogino; Tsuneo Fujikura; Yuji Shinagawa; Takeo Yamada, all of Yokohama, Japan

[73] Assignee: Hitachi, Ltd., Tokyo, Japan

[21] Appl. No.: 394,669

[22] Filed: Aug. 16, 1989

[30] Foreign Application Priority Data

Aug. 29, 1988 [JP] Japan .................. 63-212456

[51] Int. Cl.[5] .................. G09G 1/04; H01J 29/52
[52] U.S. Cl. .................... 315/383; 315/379
[58] Field of Search ............ 315/381, 382, 383, 379

[56] References Cited

U.S. PATENT DOCUMENTS 2,756,378 7/1956 Scott ........................ 315/379
4,604,555 8/1986 Karaki ..................... 315/383

Primary Examiner—Gregory C. Issing
Attorney, Agent, or Firm—Antonelli, Terry, Stout & Kraus

[57] ABSTRACT

In a grid drive-type CRT display apparatus, the impedance of a second grid voltage supply circuit is made a high impedance and a low-frequency band rejecting streaking interference caused by the high impedance is compensated by low-frequency range emphasizing circuit means. The low-frequency range emphasizing circuit means compensates for the low-frequency range rejection characteristic which is an adverse effect of the high impedance to the second grid and this results in an improvement in the high-frequency transmission characteristic. Also, there is the effect of improving the frequency bandwidth and reducing the consumption of power.

20 Claims, 4 Drawing Sheets

GRID-DRIVE TYPE DISPLAY APPARATUS

BACKGROUND OF THE INVENTION

The present invention relates to a CRT display apparatus and more particularly to a wideband video output circuit suitable for a grid drive system.

Initially in the age of vacuum tube-type television receivers, video output circuits heretofore used have been of the type which differentially drives the first grid electrode $G_1$ and the cathode electrode of a CRT.

This kind of conventional cathode-drive type display apparatus employing vacuum tubes has been disclosed in the magazine by D. G. Fink, "Television Engineering Handbook", McGraw-Hill Book Company, pp 16–255, 1957.

Also, the above kind of conventional griddrive type display apparatus employing vacuum tubes has likewise been disclosed on pages 16 to 257 of the same magazine.

Since display apparatus have subsequently been constructed with transistors, however, a cathode single-drive system has come into use. One of the reasons for cathode single-drive system coming into use has resided in that the electrostatic capacity of the first grid electrode $G_1$ has a magnitude of about 1.6 times that of the cathode electrode K. As is well known in the art, the required power of the video output circuit is proportional to the load capacity. Therefore, the first grid $G_1$-drive system has not been used due to it requiring a large power consumption.

FIG. 1 is a diagram showing the technique of a conventional CRT display apparatus. The reason for the electrostatic capacity of the first grid $G_1$ being so large relatively will now be described with reference to FIG. 1. In the Figure, numeral 1 designates a CRT, 2 a cathode electrode, 3 a first grid electrode $G_1$, 4 a second grid electrode $G_2$, 5 a cathode voltage application terminal, 6 a first grid voltage application terminal, and 7 a second grid voltage source which applies a dc voltage of about 700 V.

$C_{KS}$ is the cathode electrostatic capacity when the first grid $G_1$ is grounded, and $C_{JS}$ the first grid electrostatic capacity when the cathode K is grounded. They are given by the following equations.

$$C_{KS} = C_{K1} + C_{KK} \approx 5_pF \quad (1)$$

$$C_{JS} = C_{K1} + C_{11} + C_{12} \approx 8_pF \quad (2)$$

where
- $C_{K1}$ is the storage capacity of about $4_pF$ between the cathode K and the first grid $G_1$;
- $C_{KK}$ is the storage capacity of about $1_pF$ between the cathode K and the ground;
- $C_{11}$ is the storage capacity of about $1_pF$ between the first grid $G_1$ and the ground; and
- $C_{12}$ is the storage capacity of about $3_pF$ between the first grid $G_1$ and the second grid $G_2$.

As will be seen from the above equation (1), the value of $C_{JS}$ is greater due to the presence of $C_{12}$ of about $3_pF$.

SUMMARY OF THE INVENTION

It is a primary object of the present invention to provide a power-saving display apparatus of the first grid drive type.

It is another object of the invention to provide such display apparatus having an improved high-frequency transmission characteristic.

It is still another object of the invention to provide such display apparatus having an improved frequency bandwidth.

The above objects are accomplished by increasing the impedance of a second grid voltage supply circuit and providing low-frequency range emphasizing circuit means to compensate for a low-frequency range rejection streaking interference which is a secondary effect of the increased impedance.

In other words, while the increased impedance of the second grid voltage supply circuit improves effect, the low-frequency characteristic remains the high frequency characteristic, its secondary effect deteriorates the relative low-frequency characteristic and causes so-called streaking interference. For this reason, the above-mentioned low-frequency range emphasizing circuit is provided for the purpose of making the frequency characteristics flat over the whole range. The compensating low-frequency range emphasizing circuit means functions so as to compensate for the low-frequency rejection characteristic or the secondary effect of the increased impedance of the second grid.

DESCRIPTION OF THE PREFERRED EMBODIMENTS

Figure 2:
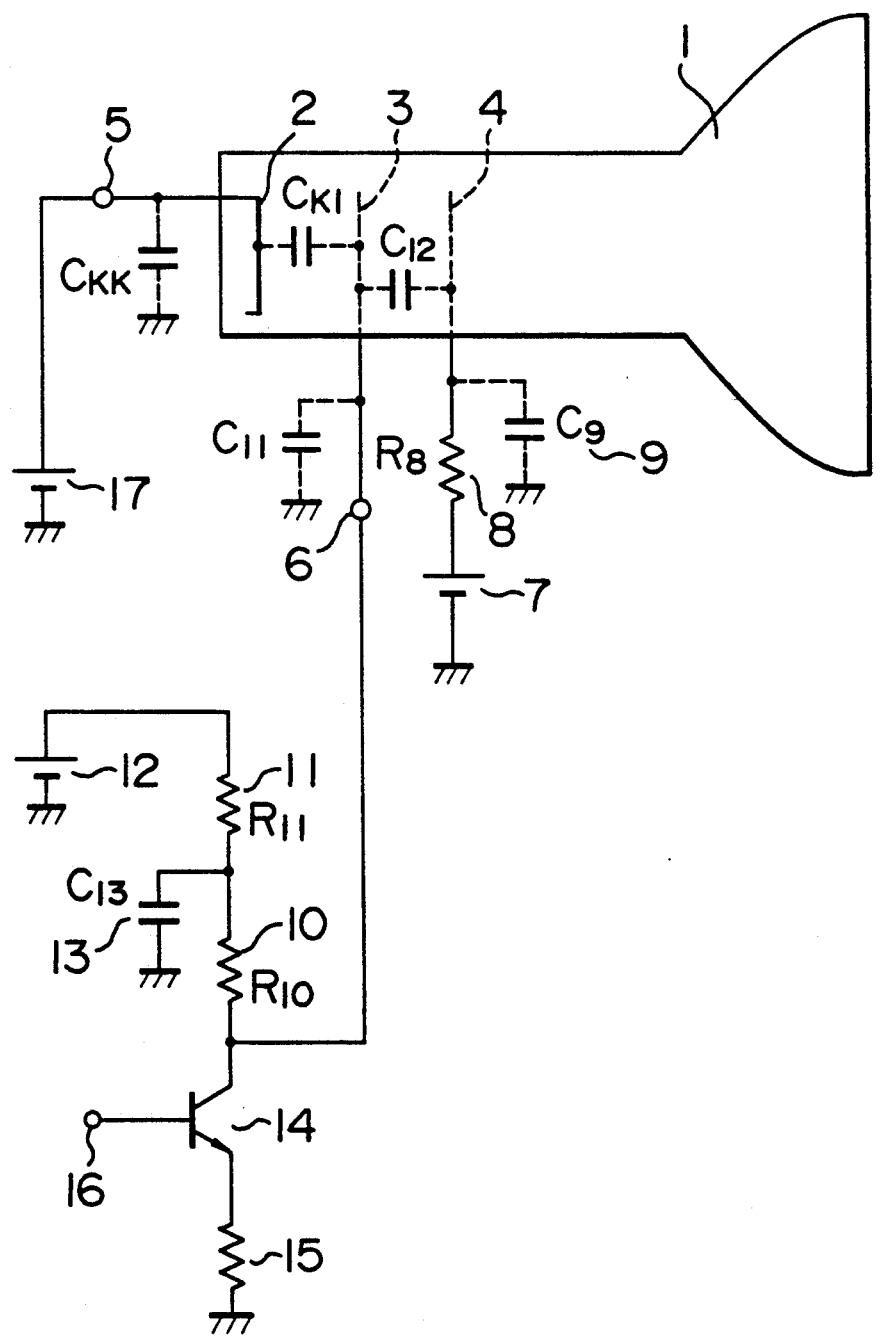
FIG. 2 is a circuit diagram showing a first embodiment of the present invention.

Referring to FIG. 2, there is illustrated a first embodiment of the present invention. In the Figure, numeral 1 designates a CRT, 2 a cathode, 3 a first grid, 4 a second grid, 5 a cathode voltage application terminal, 6 a first grid voltage application terminal, 7 a second grid voltage source, 8 a resistor for increasing the second grid impedance, 9 the ground stray capacitance of a second grid terminal having a magnitude of about $1_pF$, 10 a load resistor, 11 a low-frequency compensating resistor, 12 a voltage source, 13 a low-frequency range compensating capacitor, 14 a video output amplifying transistor, 15 an emitter resistor, 16 a video signal input terminal, and 17 a cathode voltage source. In FIG. 2, the component parts excluding the parts 8, 11 and 12 are the same with their counterparts in the ordinary first grid drive-type video output circuit. The principal part of the present invention includes the resistor 8, the low-frequency range compensating resistor 11 and the low-frequency range compensating capacitor 13. The operation of this principal part will now be described quantitatively.

In the first place, the effect and the secondary effect of the addition of the resistor 8 will be explained.

Assuming that $C_{JS}$ represents the capacitance component as looked into the first grid $G_1$ side from the terminal 6 and $C_9$ the storage capacity between the second grid $G_2$ and the ground, the series circuit of $C_9$ and $C_{12}$ is added and the following equation (3) is obtained $$C_{IS} = C_{K1} + C_{11} + \frac{C_{12}C_9}{C_{12} + C_9} \quad (3)$$

$$\approx 4_pF + 1_pF + \frac{3_pF \times 1_pF}{3_pF + 1_pF}$$

$$\approx 5.75_pF$$

In the case of the previously mentioned conventional technique, the capacitance component $C_{IS}$ is about $8_pF$ as explained in connection with equation (2) and therefore it will be seen that the value is decreased by about 30%. This means that the power consumption of the grid drive-type video output amplifier can be reduced by about 30% and therefore this satisfies the intended power saving of the present invention.

Figure 3:
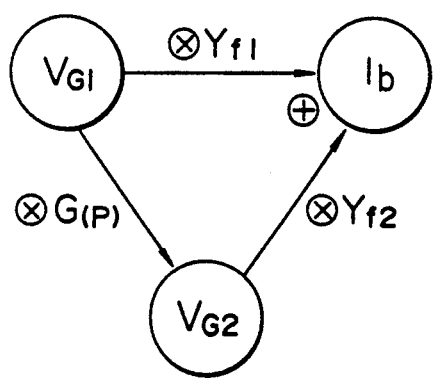
FIG. 3 is a signal flow graph for explaining the principle of the first embodiment of the invention shown in FIG. 2.

The results of the analysis on the principle of occurrence of the secondary effect will now be described. Referring to FIG. 3, there is illustrated a signal flow graph useful for explaining the first embodiment of the invention shown in FIG. 2.

In FIG. 3, designated as $V_{G1}$ is a change of the drive potential appearing at the terminal of FIG. 2. Designated as $I_b$ is a change of the CRT electron beam current discharged from the cathode K. Designated as $V_{G2}$ is a change in the potential of the second grid $G_2$. Assuming that $Y_{f1}$ represents the proportional constant between the potential change $V_{G1}$ and the current change $I_b$ and $Y_{f2}$ the proportional constant between the potential change and the current change $I_b$, in the case of the ordinary CRT there is the relation of the following equation as with a so-called vacuum tube $$\mu = \frac{Y_{f2}}{Y_{f1}} \approx 0.2 \quad (4)$$

The value of $\mu$ is an exponent which is called as the amplification factor between the first grid $G_1$ and the second grid $G_2$.

Then, the transfer function $G(P)$ from the potential change $V_{G1}$ to the potential change $V_{G2}$ is dependent on $C_{12}$, $C_9$ and $R_8$ (the resistance value of resistor 8) of FIG. 2 and it is given by the following equation ($P=jw$: complex angular frequency);

$$G(P) = \frac{V_{G2}}{V_{G1}} = \frac{PC_{12}}{PC_{12} + PC_9 + \frac{1}{R_8}} \quad (5)$$

$$= \frac{PC_{12}R_8}{1 + P(C_{12} + C_9)R_8}$$

Therefore, the overall characteristic S of the signal flow graph of FIG. 3 is given by the following equation;

$$S = \frac{I_b}{V_{G1}Y_{f1}} = 1 + G(P)\frac{Y_{f2}}{Y_{f1}} = 1 + \mu G(P) \quad (6)$$

$$= \frac{1 + P\{C_{12}(1 + \mu) + C_9\}R_8}{1 + P(C_{12} + C_9)R_8}$$

The value of the above equation (6) is $S=1$ in the low frequency range ($p=jw=0$).

On the other hand, the value of the above equation (6) approximates the following equation in the high frequency range ($p=jw=\infty$);

$$S = \frac{C_{12}(1 + \mu) + C_9}{C_{12} + C_9} \quad (7)$$

Substituting the previously-mentioned specific numerical values into equation (7), we obtain;

$$\frac{C_{12}(1 + \mu) + C_9}{C_{12} + C_9} = \frac{4 \times 1.2 + 1}{4 + 1} = \frac{5.8}{5} = 1.16$$

Therefore, the value of equation (6) becomes 1.16 in the high frequency range ($P=jw=\infty$). This means that the insertion of the resistor $R_8$ (the increased impedance) further improves the gain in the high frequency range by 16% (via the second grid $G_2$) in addition to the previously mentioned improvement of 30%.

Assuming now that $R_8 = 100$ K$\Omega$, then the value of the time constant T in equation (6) is given as follows;

$$T = (C_{12} + C_9) \times R_8 = 5_pF \times 100 \text{ K}\Omega = 0.5 \ \mu S$$

Therefore, the frequency components higher than about 0.32 MHz are improved by about 16%.

On the other hand, in the low frequency range of lower than 0.32 MHz, the value of equation (6) is 1 and therefore the improving effect of 16% disappears. As a result, an overshooting streaking interference of about 0.5 $\mu$S in width is caused in the contour portion of a video signal on a picture.

Figure 6:
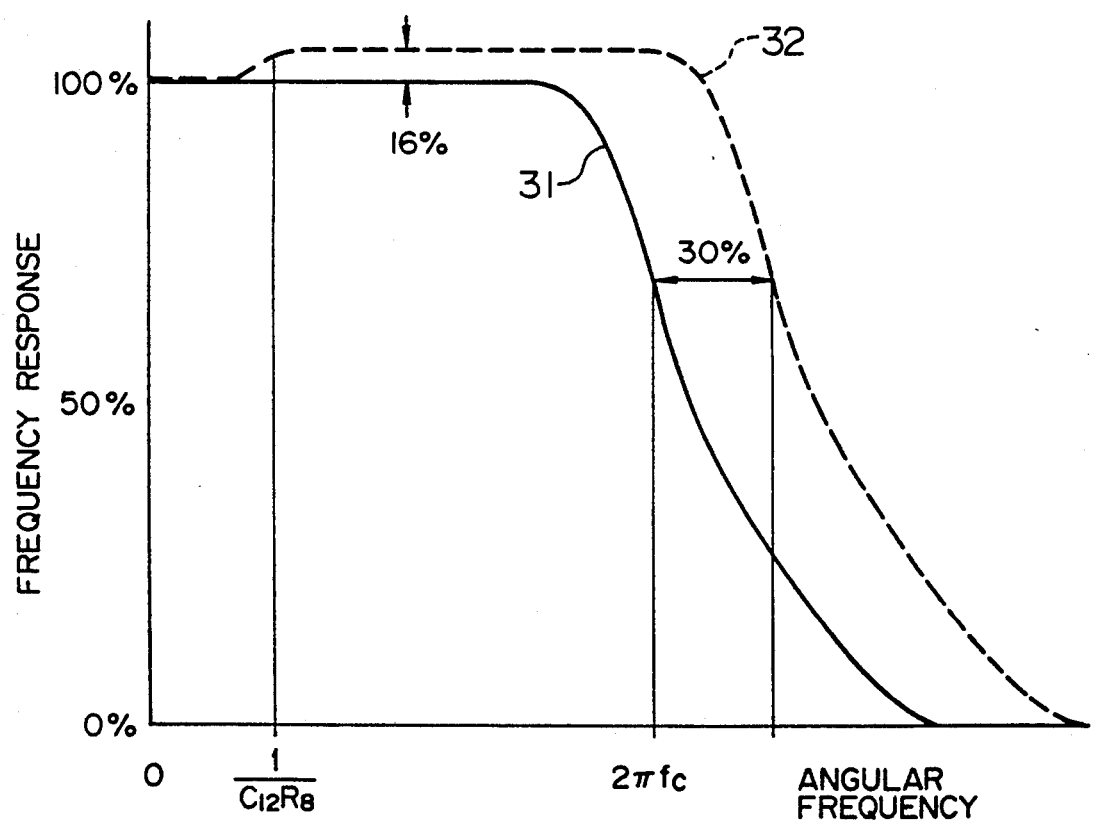
FIG. 6 is a graph of an overall frequency characteristic showing the effects of the present invention.

The resulting overall frequency characteristic is sketched in FIG. 6, wherein a solid line 31 indicates the characteristic when $R_8$ is shorted or bypassed as in the prior art, and a dotted line 32 indicates that the characteristic when $R_8$ is active or non-bypassed as in the present invention.

A description will now be made of a correction circuit for reducing the streaking interference. Here, $R_{11}$ and $C_{13}$ of FIG. 2 participate. Giving their additional effect in terms of a gain correction effect H(P) of the transistor 14, we obtain the following equation;

$$H(P) = \frac{R_{10} + \frac{1}{PC_{13} + 1/R_{11}}}{R_{10}} \quad (8)$$

$$= \left(1 + \frac{R_{11}}{R_{10}}\right)\frac{1 + PC_{13}\frac{R_{10}R_{11}}{R_{10} + R_{11}}}{1 + PC_{13}R_{11}}$$

The value of H(P) in the low frequency range ($P=jw=0$) is given as $(1+R_{11}/R_{10})$ and it becomes 1 in the high frequency range ($p=jw=\infty$). Therefore, there is a low frequency range emphasizing effect. By suitably selecting the ratio between $R_{10}$ and $R_{11}$, it is possible to reduce the streaking interference of equation (6). The rejection conditions can be determined by the following equations;

$$\begin{cases} \frac{R_{10} + R_{11}}{R_{10}} = \frac{C_{12}(1 + \mu) + C_9}{C_{12} + C_9} & (9) \\ C_{13}R_{11} = \{C_{12}(1 + \mu) + C_9\}R_8 & (10) \end{cases}$$

The value of $R_{10}$ is determined in accordance with the required bandwidth. For instance, where the required band-width is 50 MHz, the suitable value for the value of $R_{10}$ is about 500$\Omega$.

In the previously mentioned case of $C_{12}=4_pF$, $C_9=1_pF$ and $\mu=0.2$, the ratio $R_{11}/R_{10}$ is determined as 0.16 from equation (9) and thus the value of $R_{11}$ is determined as $80\Omega$.

Also, the time constant is determined from equation (10) and $C_{13} \approx 7.3$ nF is determined in the previously mentioned case of $R_8 = 100\ \Omega$.

Figure 1:
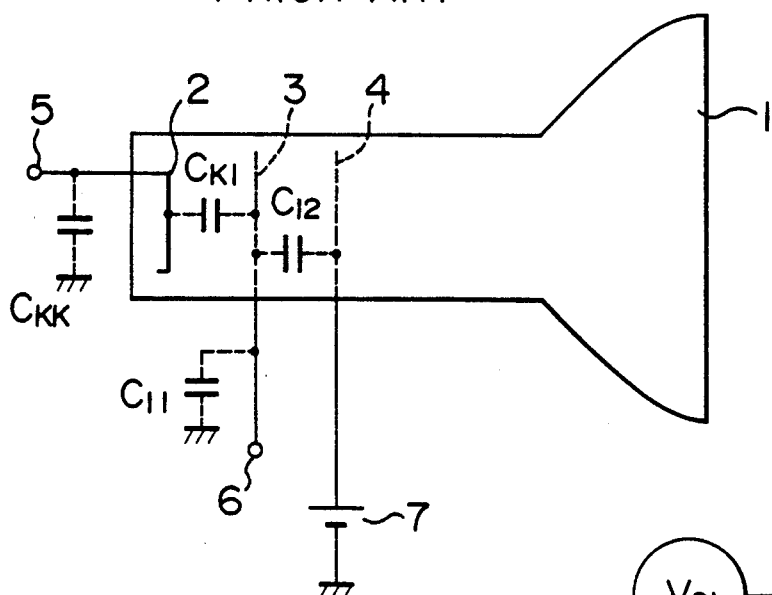
FIG. 1 is a diagram showing the technique of a conventional CRT display apparatus.

Thus, as compared with the conventional technique of FIG. 1, the construction of FIG. 2 can improve the gain-bandwidth product by $30\% + 16\% = 46\%$ even in the low frequency range and also the occurrence of streaking interference can be reduced to the minimum.

The description of the first embodiment has been completed and a second embodiment of the invention will now be described with reference to FIG. 4.

Figure 4:
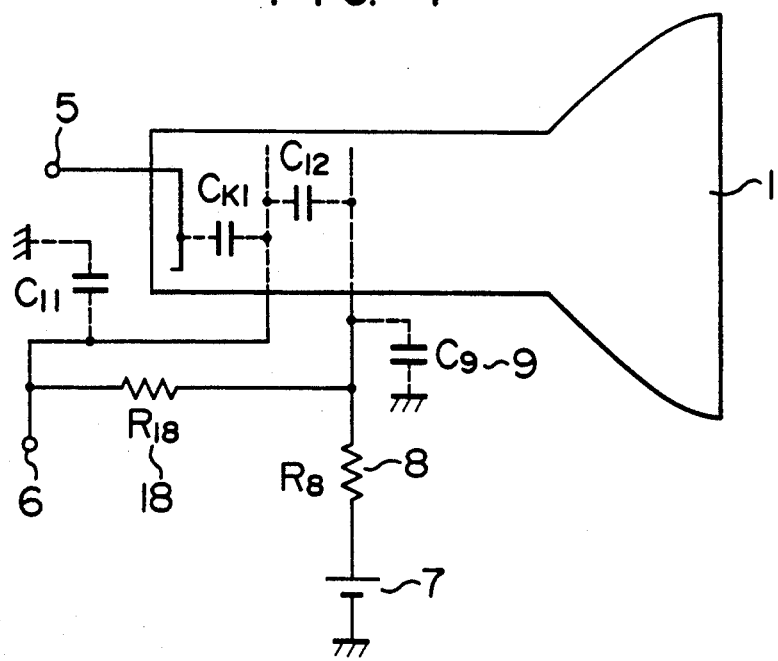
FIG. 4 is a circuit diagram showing a second embodiment of the present invention.

The embodiment of FIG. 4 is the same with the embodiment of FIG. 2 with respect to the component parts designated by numerals 1, 5, 6, 7, 8 and 9 but differs in that in FIG. 4 a resistor $R_{18}$ is used in place of $R_{11}$ and $C_{13}$ of FIG. 2.

The conditions for the rejection of streaking can be given by the following equation in accordance with the principle of similar impedances;

$$C_{12}R_{18} = C_9 R_8 \quad (11)$$

In accordance with the previously mentioned examples of the constants $C_{12}=4_pF$, $C_9=1_pF$ and $R_8=100\Omega$, $R_{18}=25$ K$\Omega$ results.

In applying to the actual use, it is possible to insert a sufficiently large dc blocking capacitor in series with the branch of $R_{18}$.

The description of the second embodiment of the present invention has been completed.

One of the two essential requirements of the present invention, i.e., the streaking preventive circuit may be arranged at any given position before the preamplifier or the transistor 14 of FIG. 2.

Figure 5:
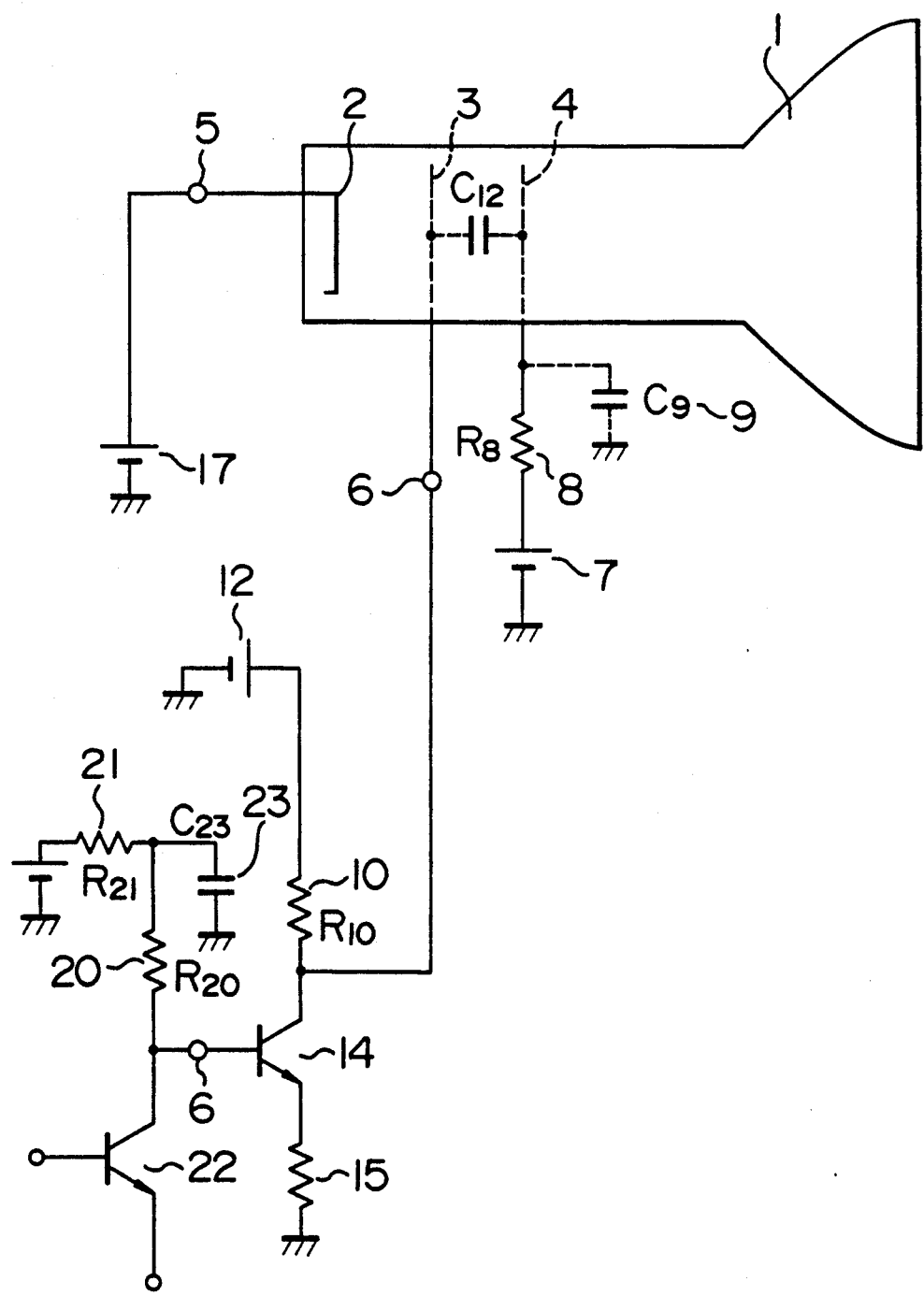
FIG. 5 is a circuit diagram showing a third embodiment of the present invention.

Referring to FIG. 5, there is illustrated a third embodiment of the invention in which a streaking preventive circuit is arranged on the input side of a video output stage. In the Figure, the component parts having the same functions as their counterparts of FIG. 2 are designated by the same numerals. In FIG. 5, numeral 22 designates a pre-amplifying transistor, and 20, 21 and 23 designate a streaking preventive circuit. The streaking preventive conditions are given by the following equations which are similar to equations (9) and (10), respectively;

$$\frac{R_{20} + R_{21}}{R_{20}} = \frac{C_{12}(1+\mu) + C_9}{C_{12} + C_9} \quad (12)$$

$$C_{23}R_{21} = \{C_{12}(1+\mu) + C_9\}R_8 \quad (13)$$

The first to third embodiments of the present invention have been described so far and some modifications of these embodiments will now be described.

In FIGS. 2 and 5, a spark gap element for discharge interference absorbing purposes can be additionally arranged in parallel with the capacitance $C_9$ at the junction point of the resistor 8 and the second grid $G_2$. In this case, the capacitance of the spark gap element, i.e., about $1_pF$ is added to the capacitance of $C_9$.

The power source 7 need not be an ideal voltage source and it may be a voltage source having an internal impedance of greater than about 1 M$\Omega$. In such a case, by inserting a bypass capacitor of greater than about 10 times $C_{12}$ between the junction point of the resistor $R_8$ and the voltage source and the ground, it can be equivalently considered as a voltage source. The reason is that by so doing, the transfer rate from the $G_1$ potential change to the $G_2$ potential change is reduced to less than about 10%.

The upper limit to the value of the resistor $R_8$, an essential part of the invention, is dependent on the leak current at the $G_2$ terminal and a value of less than about 2 M$\Omega$ is recommended. The lower limit to the value of the resistor $R_8$ is dependent on the transmission bandwidth of a video signal. By selecting such that the time constant of $R_8C_{12}$ is greater than the time constant $1/(2\pi f_c)$ of the maximum transmission frequency $f_c$, the effect of the invention is ensured. In other words, it is given by the following equation;

$$R_8 \geq \frac{1}{2\pi f_c C_{12}} \quad (14)$$

In the above equation (14), $1/(2\pi f_c)$ is the time constant of the maximum transmission frequency and is equal to the reciprocal of the angular frequency bandwidth of the video signal.

Regarding the upper limit of the value of resistor $R_8$, when this value is selected to be less than about 5 times the value of the right term of equation (14) (5 K$\Omega$ to 1 K$\Omega$ if $f_c=50$ MHz and $C_{12}=3_pF$), the length of a streaking interference in a picture is reduced in width and it becomes inconspicuous from the visibility point of view. Therefore, depending on the intended use or application of the display, the streaking interference rejection circuit can be omitted. Alternatively, $R_8$ can be selected to be at least 5 times greater than the value of the right term of equation (14), i.e., the product of $R_8$ and $C_{12}$ can be selected to be at first 5 times greater than the reciprocal of the angular frequency bandwidth, but in such a case, a low pass filter should be provided to effectively reduce streaking interference.

While the embodiment of the present invention have been described to be of the type in which a video signal is applied from only the first grid, the invention can be applied as such to a so-called cathode-first grid parallel drive system in which a video signal of the reverse polarity is also applied to the cathode.

It is to be noted that in the cathode single-drive system the application of the second grid terminal high-frequency high-impedance technique of the present invention is rather detrimental. The reason is that although not shown in FIG. 2, an electrostatic capacity of the order of about $0.2_pF$ exists between the cathode electrode K and the second grid electrode $G_2$ within the CRT and thus a cathode potential change is proportionately transferred at a high frequency to the second grid potential. While an increase in the cathode potential is essentially of the polarity which decreases the beam current, an increase in the second grid potential acts conversely to increase the beam current.

While this action slightly decreases the effect of the invention in its application to the cathode-first grid differential drive system, the magnitude of $0.2_pF$ is negligibly small as compared with the magnitude, i.e., $3_pF$, of $C_{12}$. Therefore, its effectiveness is ensured.

In view of the understanding of the high-frequency grounding of the second grid in the general use conditions of vacuum tubes, it has been common practice in the past to ground the second grid of the CRT in a high frequency manner (i.e. to connect an external capacitor to the second grid) present invention has changed this understanding. The reason for this change is based on the discovery by the inventors of the fact that while, in a vacuum tube, a part of the electron current is trapped by the second grid $G_2$ thus causing the flow of current, in a CRT the electron beam is subjected to a converging action by the second grid $G_2$ and there is trapping and hence no current flow.

In accordance with the present invention, contrary to the conventional understanding, the impedance for the second grid potential is better to be increased in a high frequency region and thereby the high-frequency transmission characteristic in the first grid-drive system can be improved all the more. The extent of the improvement is as large as about 46% as compared with the conventional technique and thus there is the effect of improving the frequency bandwidth as well as the saving of power.

We claim:

1. A grid drive-type display apparatus for applying a video signal to at least a first grid electrode of a CRT, said apparatus comprising:
a resistor connected in series between a second grid electrode of said CRT and a second grid voltage supply source, wherein said resistor has a resistance value such that a product of a capacitance value between said second grid electrode and said first grid electrode and said resistance value is greater than a reciprocal of an angular frequency bandwidth of said video signal.

2. A display apparatus according to claim 1, further comprising:
low-phase filter means for reducing streaking interference in said video signal.

3. A display apparatus according to claim 2, wherein said low-pass filter means is connected between a collector resistor of a video amplifier for amplifying said video signal and a voltage source.

4. A display apparatus according to claim 2, wherein said product is at least five times greater then said reciprocal.

5. A display apparatus according to claim 3, wherein said product is at least five times greater then said reciprocal.

6. A display apparatus according to claim 1, wherein said product is at least five times greater then said reciprocal.

7. A display apparatus according to claim 1, wherein said second grid electrode is not connected to an external capacitor and wherein said resistor is a non-bypassed resistor.

8. A grid drive-type display apparatus for applying a video signal to at least a first grid electrode of a CRT, said apparatus comprising:
a resistor connected in series between a second grid electrode of said CRT and a second grid voltage supply source, wherein said resistor has a resistance value such that a product of a capacitance value between said second grid electrode and said first grid electrode and said resistance value is greater than a reciprocal of an angular frequency bandwidth of said video signal, and said second grid electrode of said CRT has no external capacitance connected thereto.

9. A display apparatus according to claim 8, further comprising:
low-pass filter means for reducing streaking interference in said video signal.

10. A display apparatus according to claim 9, wherein said low-pass filter means is connected between a collector resistor of a video amplifier for amplifying said video signal and a voltage source.

11. A display apparatus according to claim 8, wherein said product is at least five times greater than said reciprocal.

12. A display apparatus according to claim 9, wherein said product is at least five times greater than said reciprocal.

13. A display apparatus according to claim 10, wherein said product is at least five times greater than said reciprocal.

14. A grid drive-type display apparatus for applying a video signal to at least a first grid electrode of a CRT, said apparatus comprising:
a resistor connected in series between a second grid electrode of said CRT and a second grid electrode supply source, wherein said resistor has a resistance value such that a time constant of a product of a capacitance value between said second grid electrode and said first grid electrode and said resistance value is greater than a time constant of a maximum transmission frequency of said video signal.

15. A display apparatus according to claim 14, further comprising:
low-pass filter means for reducing streaking interference in said video signal.

16. A display apparatus according to claim 15, wherein said low-pass filter means is connected between a collector resistor of a video amplifier for amplifying said video signal and a voltage source.

17. A display apparatus according to claim 14, wherein said time constant of said product is at least five times greater than said time constant of said maximum transmission frequency of said video signal.

18. A display apparatus according to claim 15, wherein said time constant of said product is at least five times greater than said time constant of said maximum transmission frequency of said video signal.

19. A display apparatus according to claim 16, wherein said time constant of said product is at least five times greater than said time constant of said maximum transmission frequency of said video signal.

20. A display apparatus according to claim 14, wherein said second grid electrode has no external capacitance connected thereto and wherein said resistor is a non-bypassed resistor.

* * * * *